Figure 1:
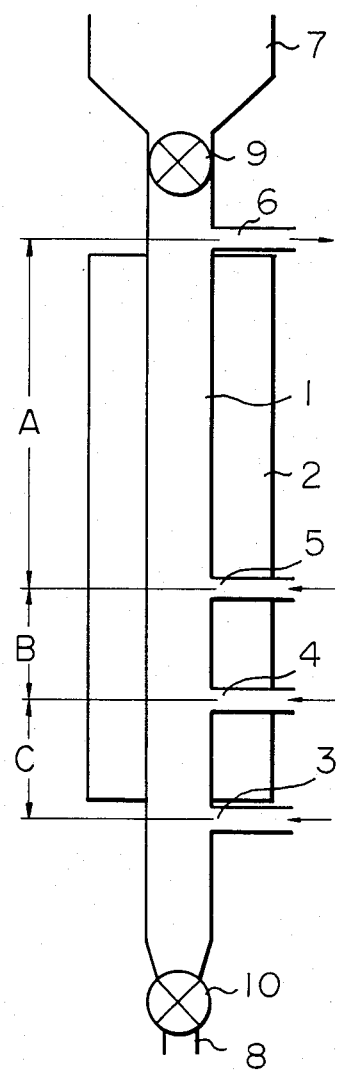

United States Patent [19]

Iwai et al.

[11] Patent Number: 4,490,344

[45] Date of Patent: Dec. 25, 1984

[54] PRODUCTION PROCESS OF SILICON TETRACHLORIDE

[75] Inventors: Tadashi Iwai; Hisayuki Mizuno; Masao Miura, all of Ube, Japan

[73] Assignee: UBE Industries, Ltd., Yamaguchi, Japan

[21] Appl. No.: 420,857

[22] Filed: Sep. 21, 1982

[30] Foreign Application Priority Data

Sep. 29, 1981 [JP] Japan .................................. 56-153024

[51] Int. Cl.$^3$ .............................................. C01B 33/08
[52] U.S. Cl. .................................. 423/341; 423/278; 423/292
[58] Field of Search ................ 423/341, 342, 278, 292

[56] References Cited

U.S. PATENT DOCUMENTS 2,983,583  5/1961  Schechter ........................... 423/292
3,000,705  9/1961  Juckniess ............................ 423/292

FOREIGN PATENT DOCUMENTS 57-42524  3/1982  Japan ................................... 423/341
75041     5/1949  Norway .............................. 423/341

*Primary Examiner*—Jack Cooper
*Attorney, Agent, or Firm*—Burgess, Ryan & Wayne

[57] ABSTRACT

Silicon tetrachloride is effectively and efficiently produced at a relatively low temperature and at a high yield by (1) feeding a mixture of a silicon dioxide containing substance and carbon to the top of a reactor in which a reaction mixture forms a downwardly flowing moving bed, (2) feeding gaseous boron trichloride to an intermediate portion of the reactor, (3) feeding gaseous chlorine to a portion of the reactor located below the boron trichloride feed portion, and (4) feeding an inert gas to a portion of the reactor located below the chlorine feed portion, whereby a silicon tetrachloride formation reaction is carried out in the moving bed and the formed silicon tetrachloride is recovered from a gas mixture discharged from the top of the reactor.

15 Claims, 1 Drawing Figure

PRODUCTION PROCESS OF SILICON TETRACHLORIDE

The present invention relates to an improved process for producing silicon tetrachloride.

Silicon tetrachloride is useful as a starting material for various organic silicon compounds and also as a starting material for finely divided silica, high purity quartz, silicon nitride, silicon carbide and other silicon containing inorganic materials.

Known typical processes for producing silicon tetrachloride are:

(1) those wherein silicon carbide, ferrosilicon or similar silicon containing substances are reacted with chlorine; and (2) those wherein a mixture of a silicon dioxide containing substance and carbon, for example, a mixture of silica stone and activated carbon is reacted with chlorine.

However, the above-mentioned conventional processes (1) have a disadvantage in that the starting materials are very expensive because a large amount of electric power is required for the production of the starting silicon carbide and ferrosilicon. Furthermore, the above-mentioned conventional processes (2) have a disadvantage in that an extremely high temperature e.g., 1200° C. or more is required for smoothly proceeding the above-mentioned reaction with chlorine and producing the desired silicon tetrachloride at an acceptable yield, although the starting materials are inexpensive.

In order to solve these disadvantages of the conventional processes, the inventors have conducted an extensive study and have found that silicon tetrachloride can be produced at a reaction temperature extremely lower than 1200° C., e.g., at a temperature of about 500° C. by reacting a silicon dioxide containing substance such as silica stone or silica flour with boron trichloride according to the following equation:

$$3SiO_2 + 4BCl_3 \rightarrow 3SiCl_4 + 2B_2O_3 \tag{1}$$

Thus, the desired silicon tetrachloride can be produced at a high yield and the reaction can smoothly proceed at a relatively low temperature. However, this process still has disadvantages in that boron trichloride should be used in a stoichiometric amount and in that diboron trioxide formed, as a byproduct, together with the desired silicon tetrachloride should be reduced and chlorinated to boron trichloride in an additional boron trichloride regeneration apparatus to reuse the diboron trioxide in the production of silicon tetrachloride.

The objects of the present invention are to eliminate the above-mentioned disadvantages of the production processes of silicon tetrachloride and to provide a process for effectively and efficiently producing silicon tetrachloride at a relatively low reaction temperature and at a high yield.

Other objects and advantages of the present invention will be apparent from the following description.

In accordance with the present invention, there is provided a process for producing silicon tetrachloride comprising the steps of:

feeding a mixture of a silicon dioxide containing substance and carbon to the top of a reactor in which a reaction mixture forms a downwardly flowing moving bed;

feeding gaseous boron trichloride to an intermediate portion of the reactor;

feeding gaseous chlorine to a portion of the reactor located below the boron trichloride feed portion; and feeding an inert gas to a portion of the reactor located below the chlorine feed portion;

whereby a silicon tetrachloride formation reaction is carried out in the moving bed and the formed silicon tetrachloride is recovered from a gas mixture discharged from the top of the reactor.

The present invention will be better understood from the description set forth below with reference to the accompanying drawing of FIG. 1, which is a schematic sectional view illustrating a typical embodiment of an apparatus suitable for use in the practice of the present invention.

According to the present invention, silicon tetrachloride is produced by the above-mentioned reaction (1) by using as a chlorinating agent boron trichloride and, therefore, can be produced at a relatively low reaction temperature but a high yield.

The boron trichloride used as a chlorinating agent is converted into diboron trioxide in the form of a solid or liquid in the above-mentioned reaction (1). The diboron trioxide thus formed adheres to a reaction mixture which forms a downwardly flowing moving bed in the reactor and is reacted with carbon and gaseous chlorine, which is fed to the reactor at a portion below the boron trichloride feed portion under the following reactions (2) and (3):

$$B_2O_3 + 3Cl_2 + 3C \rightarrow 2BCl_3 + 3CO \tag{2}$$

$$2B_2O_3 + 6Cl_2 + 3C \rightarrow 4BCl_3 + 3CO_2 \tag{3}$$

Thus, gaseous boron trichloride is regenerated. The gaseous boron trichloride thus regenerated upwardly flows through the moving bed formed in the reactor and is repeatedly reacted with a silicon dioxide containing substance under the above-mentioned reaction (1) to form the desired silicon tetrachloride. Thus, boron trichloride fed to the reactor is repeatedly utilized and is, finally, discharged from the top of the reactor together with silicon tetrachloride as a gas mixture. The boron trichloride discharged from the reactor can be recovered from the gas mixture and can again be fed to the reactor. As a result, substantially all boron trichloride fed to the reactor can be utilized in the production of silicon tetrachloride.

Furthermore, according to the present invention, the diboron trioxide formed as a byproduct in the reaction (1) can be substantially completely converted into boron trichloride by the reactions (2) and (3) since gaseous chlorine is fed to the reactor at a portion below the boron trichloride feed portion. In addition, even if chlorine, boron trichloride and other substances are adsorbed onto the reaction residue, these substances are desorbed from the reaction residue by an inert gas fed from a portion below the gaseous chlorine feed portion. The chlorine and boron trichloride thus desorbed upwardly flow through the moving bed formed in the reactor. Thus, not only are the chlorine and boron trichloride effectively utilized in the production of silicon tetrachloride, but also the entrainment (or discharge) of the chlorine and boron trichloride together with the reaction residue discharged from the bottom of the reactor is effectively prevented. As a result, the handling of the reaction residue can be facilitated.

The term "reaction mixture" used herein includes, in addition to a mixture of a silicon dioxide containing substance and carbon, the reaction residues of the above-mentioned reactions (1), (2) and (3).

Typical examples of the silicon dioxide containing substances usable in the present invention are silica stone, silica flour (i.e, a byproduct obtained in the production of, for example, metallic silicon and ferrosilicon and containing a large amount of $SiO_2$), fly ash (ash particles containing a large amount of $SiO_2$ obtained from a flue and a dust collector in the combustion of finely divided coal), silica sol, silica, and carbonization products of silicate plants (e.g., carbonization products containing $SiO_2$ and amorphous carbon derived from the carbonization, at 300° to 1300° C., of, for example, chaff and straw of rice, barley and wheat, bamboo leaves, leaves and stems of corn). These substances can be used alone or in any mixture thereof. These silicon dioxide containing substances are used in the form of a mixture with carbon, desirably amorphous carbon such as activated carbon, coke, charcoal and carbon black. These substances can be used alone or in any mixture thereof.

The mixture of the silicon dioxide containing substance and the carbon desirably contains at least 2 gram atoms, more desirably 3 to 15 gram atoms of the carbon (C), based on 1 mol of the silicon dioxide ($SiO_2$) in the mixture. Too small an amount of the carbon in the mixture tends to cause insufficient regeneration of the boron trichloride from diboron trioxide in the moving bed and to decrease the yield of the desired silicon tetrachloride. Therefore, the suitable amount of the carbon in the above-mentioned mixture is at least 2 gram atoms based on 1 mol of the silicon dioxide in the mixture. When the carbonization products of the silicate plant are used as a silicon dioxide containing substance, no additional carbon is required since said carbonization products generally contain about 6 to 10 gram atoms of amorphous carbon based on 1 mol of silicon dioxide.

The mixture of the silicon dioxide and the carbon is suitably used in the present invention in the form of particles after molding the mixture with any conventional molding machine such as an extrusion molding machine, a tableting machine, a spray granulator, a rotating granulator or a fluidized bed granulator. The mixture of the silicon dioxide and the carbon may be supported on an inert carrier such as α-alumina.

When the mixture of the silicon dioxide containing substance and the carbon contain water adsorbed thereto or a substance capable of forming water upon heating, the regeneration of boron trichloride from diboron trioxide becomes insufficient, the utility efficiency of chlorine is decreased and the yield of silicon tetrachloride is decreased. Therefore, the mixture is desirably subjected to a heating and dehydrating treatment in an inert gas atmosphere such as argon, helium or nitrogen, or under a reduced pressure, before the use of the mixture. The heating and dehydrating treatment can be carried out either before or after the mixing of the silicon dioxide containing substance and the carbon. The heating and dehydrating treatment is suitably carried out at a temperature of 150° C. to 1000° C., desirably 200° C. to 800° C. for 0.5 to 20 hours.

As illustrated in FIG. 1, a starting mixture of the silicon dioxide containing substance and the carbon is fed to the top of reactor 1 in which a reaction mixture forms a downwardly flowing moving bed through, for example, hopper 7 via valve 9. The starting mixture can be continuously or intermittently fed. There is no special limitation of the feed amount of the starting mixture. However, when the feed amount of the reaction mixture is too large as compared with the amount of boron trioxide contained in the moving bed formed in reactor 1, the reaction residue containing a relative large amount of unreacted silicon dioxide is discharged from the bottom of reactor 1, i.e., reaction residue discharge 8 of reactor 1. Contrary to this, when the feed amount of the mixture is too small, the production amount of the desired silicon tetrachloride is decreased and the utility efficiency of boron trichloride is also decreased. Accordingly, the mixture of the silicon dioxide containing substance and the carbon is suitably 0.1 to 50 mols, desirably 0.5 to 30 mols, in terms of silicon dioxide, based on 1 mol of boron trichloride contained in the moving bed formed in reactor 1.

The gaseous boron trichloride is fed to the moving bed formed in reactor 1 from intermediate portion 5 of reactor 1 so as to sufficiently effect the above-mentioned reaction (1). The gaseous boron trichloride thus fed is brought into countercurrent contact with the reaction mixture of the silicon dioxide containing substance and the carbon downwardly flowing in reactor 1. Thus, silicon tetrachloride is formed by the above-mentioned reaction (1).

The gaseous chlorine is fed to the moving bed formed in reactor 1 from portion 4 of reactor 1 which is located below boron trichloride feed portion 5. The gaseous chlorine should be fed to reactor 1 from the portion below the boron trichloride feed portion. This is because, when the gaseous chlorine is fed to reactor 1 from a portion above the boron trichloride feed portion, a large amount of unreacted chlorine is discharged together with a gas mixture from the top of reactor 1 and diboron trioxide is discharged from the bottom of reactor 1 together with the reaction residue. This causes an undesirable decrease in the production amount of silicon tetrachloride. The chlorine fed from chlorine feed portion 4 is brought into countercurrent contact with the reaction mixture downwardly flowing in reactor 1 containing diboron trioxide formed in the above-mentioned reaction (1) and the reaction residue of the above-mentioned reaction (1) of the reaction mixture of the silicon dioxide containing substance and the carbon. Thus, diboron trioxide is converted into boron trichloride by the above-mentioned reactions (2) and (3). The gaseous chlorine usable in the practice of the present invention includes pure chlorine gas, and chlorine gas diluted with an inert gas such as argon, helium or nitrogen.

The feed amount of the gaseous chlorine to the reactor may be varied depending upon, for example, the feed amount of boron trichloride, the feed amount of the mixture of the silicon dioxide containing substance and the carbon and the reaction conditions. Generally speaking, the feed amount of the gaseous chlorine is such that the amount of chlorine is 1 to 30 gram atoms, desirably 3 to 20 gram atoms, based on 1 mol of the boron trichloride contained in the moving bed formed in the reactor.

According to the present invention, an inert gas such as nitrogen, argon or helium is further fed to the moving bed formed in reactor 1 from portion 3 of reactor 1 which is located below chlorine feed portion 4. The feed of the inert gas from portion 3 located below chlorine feed portion 4 causes the desorption of, for example, chlorine and boron trichloride adsorbed onto the downwardly flowing reaction residue. The desorbed chlorine and boron trichloride together with the inert gas upwardly flow through the moving bed formed in reactor 1. Thus, the chlorine is effectively utilized in the regeneration reaction of boron trichloride from the diboron trioxide and the boron trichloride is effectively utilized in the production reaction of silicon tetrachloride.

Inert gas feed portion 3 is desirably located near the reaction residue discharge portion at the bottom of reactor 1. When the inert gas is not fed to reactor 1 or the inert gas is fed to reactor 1 from a portion above gaseous chlorine feed portion 4, the reaction residue containing, for example, chlorine and boron trichloride adsorbed thereon is discharged from reactor 1. This causes not only a troublesome post-treatment problem not only concerning the reaction residue, but also the utility efficiency of the chlorine and the boron trichloride is undesirably decreased.

The feed amount of the inert gas fed from portion 3 located below chlorine gas feed portion 4 may be such that the chlorine and the boron trichloride adsorbed onto the reaction residue can be desorbed. Generally speaking, the inert gas is suitably fed in an amount of 5 to 1000 times by volume, desirably 10 to 100 times by volume, of the reaction mixture forming the moving bed, although this depends upon the reaction conditions.

The temperature of the moving bed in reactor 1 is generally 300° C. to 1200° C., desirably 400° C. to 1000° C. Too low a temperature of the moving bed decreases the production rate of the silicon tetrachloride and also causes insufficient regeneration of the boron trichloride from diboron trioxide and insufficient desorption of the chlorine and the boron trichloride from the reaction residue by the inert gas. Contrary to this, too high a temperature of the moving bed does not result in any advantageous effect and is not economical from the viewpoint of thermal energy. Accordingly, the above-mentioned temperature range is suitable. The temperature of the moving bed can be controlled by any known device, for example, heating jacket 2 illustrated in FIG. 1.

According to the present invention, the temperatures of the zone between inert gas feed portion 3 and gaseous chlorine feed portion 4, the zone between gaseous chlorine feed portion 4 and boron trichloride feed portion 5 and the zone between boron trichloride feed portion 5 and the top portion of reactor 1 can be varied and can be separately or individually controlled by any conventional means, in order to effectively carry out the production reaction of silicon tetrachloride, the regeneration reaction of boron trichloride from diboron trioxide and the desorption of the chlorine and the boron trichloride from the reaction mixture. Furthermore, the residence times of the reaction mixture in the above-mentioned zones may be varied for the same purpose.

The reactors usable in the practice of the present invention are, in addition to vertical type reactors as illustrated in FIG. 1, inclined horizontal type reactors such as a rotary kiln. The distance A between the reaction mixture feed portion (i.e., the top of the effective zone of reactor 1) and boron trichloride feed portion 5, the distance B between boron trichloride feed portion 5 and gaseous chlorine feed portion 4 and the distance C between gaseous chlorine feed portion 4 and inert gas feed portion 3 can be optionally determined, depending upon, for example, the temperature of the moving bed, the moving rate of the reaction mixture, the feed rate of each gas, the kind and size of the reactor, so as to desirably effect the production reaction of silicon tetrachloride, the regeneration reaction of boron trichloride from diboron trioxide and the desorption of the chlorine and the boron trichloride from the reaction residue. Desirable distances A, B and C are 3/10 to 7/10, 1/10 to 4/10 and 1/10 to 4/10, of the effective length of the reactor, respectively.

In the practice of the present invention, a gas mixture containing silicon tetrachloride and boron trichloride is discharged from gas outlet 6 located at the top of reactor 1. The reaction residue of the reaction mixture of the silicon dioxide containing substance and the carbon is discharged from outlet 8 located at the bottom of reactor 1 through valve 10.

The silicon tetrachloride thus formed is readily recovered from the gas mixture discharged from the top of reactor 1 by any conventional method, for example, by condensing the gas mixture upon cooling, followed by the distillation of the collected product in the form of liquid.

The present invention now will be further illustrated by, but is by no means limited to, the following Examples, in which all parts and percentages are expressed on a weight basis unless otherwise noted.

EXAMPLE 1

One thousand and one hundred and eighty parts of silica flour ($SiO_2$ content: 91.5%) were mixed with 1800 parts of finely divided coke. The mixture was granulated by using as a binder 350 parts of silica sol ($SiO_2$ content: 30%) to pellets having a diameter of 1 to 3 mm by means of a rotary granulator and the pellets were dried at a temperature of 400° C. for one hour in a nitrogen stream. The atomic ratio of carbon to silicon (C/Si) of the resultant pellets was 6.

One hundred and sixty grams of the pellets obtained above were filled into a vertical type quartz reaction tube as illustrated in FIG. 1 having an inner diameter of 24 mm and a heating zone length of 60 cm. The reaction tube was heated to a temperature of 600° C. with a heating jacket. Nitrogen gas was fed at a feed rate of 100 ml/min from an inert gas feeding portion located at the bottom of the heating zone. Gaseous chlorine was fed at a feed rate of 650 ml/min from a chlorine feed portion located 10 cm above the inert gas feed portion. Gaseous boron trichloride was fed at a feed rate of 110 ml/min from a boron trichloride feed portion located 10 cm above the chlorine feed portion. The reaction mixture in the form of the pellets obtained above was fed at a feed rate of 90 g/hr from the reaction tube through a hopper provided at the top of the reaction tube. Thus, the reaction was continuously carried out for 5 hours while the moving bed was formed in the reaction tube.

The gas mixture discharged from a gas outlet located at the top of the heating zone of the reaction tube was cooled and collected in a dry ice-methanol bath. The contents of silicon tetrachloride, boron trichloride and chlorine contained in the collected product were determined by a chemical analysis. As a result, no chlorine was observed in the collected product and substantially 100% of the boron trichloride was recovered in the collected product. Six hundred and sixty grams of silicon tetrachloride were obtained by distilling the collected product. Furthermore, neither chlorine, diboron trioxide nor boron trichloride was observed in the reaction residue discharged from the bottom of the reaction tube.

COMPARATIVE EXAMPLE 1

Silicon tetrachloride was prepared in the same manner as in Example 1, except that gaseous chlorine was fed, together with boron trichloride, from the boron trichloride feed portion instead of the chlorine feed portion. The reaction time was 5 hours.

As a result, the yield of silicon tetrachloride was 350 g. About 44% of boron trichloride fed to the reaction tube was recovered from the top of the reaction tube and the remainder of boron trichloride was detected as diboron trioxide in the reaction residue discharged from the bottom of the reaction tube.

We claim:

1. A process for producing silicon tetrachloride from carbon, silicon dioxide and chlorine comprising the steps of:
   (a) feeding a mixture of a silicon dioxide containing substance and carbon to the top of a reactor in which a reaction mixture forms a downwardly flowing moving bed maintained at a temperature of from 300° C. to 1200° C.;
   (b) feeding gaseous boron trichloride to an intermediate portion of the reactor to react with the $SiO_2$ to form $SiCl_4$ by the reaction $$3 SiO_2 + 4BCl_3 \rightarrow 3SiCl_4 + 2B_2O_3; \quad (1)$$

(c) feeding gaseous chlorine to a portion of the reactor below the boron trichloride feed whereby $B_2O_3$ formed in reaction (1) reacts with $Cl_2$ and carbon to form $BCl_3$ by the reactions $$B_2O_3 + 3Cl_2 + 3C \rightarrow 2BCl_3 + 3CO; \quad (2)$$

$$2B_2O_3 + 6Cl_2 + 3C \rightarrow 4BCl_3 + 3CO_2; \quad (3)$$

(d) feeding an inert gas to a portion of the reactor located below the chlorine feed to strip volatile materials from reaction residues and withdrawing a gas mixture comprising silicon tetrachloride, boron trichloride and inert gas from the top of the reactor and recovering silicon tetrachloride therefrom.

2. A process as claimed in claim 1, wherein said silicon dioxide containing substance is silica stone, silica flour, fly ash, silica sol, silica, or carbonization products of silicate plants.

3. A process as claimed in claim 1, wherein said carbon is activated carbon, coke, charcoal or carbon black.

4. A process as claimed in claim 1, wherein said mixture fed to the top of the reactor is in the form of particles.

5. A process as claimed in claim 4, wherein said particles are subjected to a dehydrating treatment before feeding the same to the reactor.

6. A process as claimed in claim 1, wherein the amount of the carbon in the mixture of the silicon dioxide containing substance and the carbon is at least 2 gram atoms based on 1 mol of the silicon dioxide.

7. A process as claimed in claim 6, wherein the amount of carbon is 3 to 15 gram atoms based on 1 mol of silicon dioxide.

8. A process as claimed in claim 1, wherein the feed amount of the chlorine is 1 to 30 gram atoms based on 1 mol of the boron trichloride contained in the moving bed.

9. A process as claimed in claim 8, wherin the amount of chlorine is 3 to 20 gram atoms based on 1 mol of boron trichloride contained in the moving bed.

10. A process as claimed in claim 1, wherein the feed amount of said mixture fed to the top of the reactor is 0.1 to 50 mols, in terms of silicon dioxide, based on 1 mol of the boron trichloride contained in the moving bed.

11. A process as claimed in claim 10, wherein the amount of said mixture fed to the top of the reactor is 0.5 to 30 mols, in terms of silicon dioxide, based on 1 mol of boron trichloride contained in the moving bed.

12. A process as claimed in claim 1, wherein the temperature of the flowing moving bed is maintained at 400° C. to 1000° C.

13. A process as claimed in claim 1, wherein the amount of said inert gas is 5 to 1000 times by volume of the reaction mixture forming the moving bed.

14. A process as claimed in claim 13, wherein the amount of said inert gas is 10 to 100 times by volume of the reaction mixture forming the moving bed.

15. The process of claim 1, wherein the boron trichloride is recycled to the reactor.

* * * * *